Patented Dec. 12, 1933

1,939,261

UNITED STATES PATENT OFFICE 1,939,261

TREATMENT OF CELLULOSE ACETATE MATERIALS

Archibald John Hall, Timbersbrook, England, assignor to Celanese Corporation of America, a corporation of Delaware No Drawing. Original application July 22, 1925, Serial No. 45,416, and in Great Britain July 31, 1924. Divided and this application December 24, 1929. Serial No. 416,304

5 Claims. (Cl. 8—20)

This invention relates to the treatment of cellulose acetate products with hot or boiling aqueous liquors and is a divisional from my co-pending application No. 45416 dated 22nd July, 1925.

It is well known that when cellulose acetate artificial silk is immersed in boiling water or water whose temperature exceeds about 85° C., it becomes curly or woolly, and loses a considerable proportion of its lustre and transparency. I have now discovered and this discovery forms the basis of this invention, that the resistance against loss of transparency and lustre of such silk when heated at about 100° C., for prolonged periods in the presence of water, is increased by the presence of soluble salts of multi-valent metals.

Generally the protective power of suitable salts is greater in concentrated aqueous solutions than in dilute solutions.

The following salts are examples of suitable protective agents for cellulose acetate artificial silk:—Magnesium nitrate, magnesium chloride, magnesium sulphate, calcium chloride, barium chloride, strontium chloride, zinc chloride, zinc sulphate, cadmium chloride, copper sulphate, alum, chrome alum, iron alum, ferrous sulphate, ferrous ammonium sulphate, aluminium chloride.

All the above substances exert their protective action for cellulose acetate when used in from 10% to 30% aqueous solution, but it is to be understood that these concentrations are only stated by way of example and that it is not to be inferred that all solutions of concentrations falling outside these limits are unsuitable for protecting cellulose acetate artificial silk against delustring.

In the use of soluble salts of multivalent metals as protective agents in the treatment of cellulose acetate artificial silk with hot aqueous liquors, the presence in such liquors of substances likely to precipitate the metals, for example common soaps, should be avoided.

Among numerous processes in which my discovery has useful applications are: the dyeing in boiling liquors of fabrics containing cellulose acetate and woollen fibres, the discharging of dyed cellulose acetate fabrics in boiling liquors and the relief or production of latent strains in cellulose acetate fabrics or products by immersion in a boiling aqueous liquor.

What I claim and desire to secure by Letters Patent is:—

1. Process for preventing loss of lustre in bleaching, dyeing, printing, steaming and otherwise treating textile materials, films and other materials comprising cellulose acetate at temperatures in excess of about 85° C., characterized in that the treatment is effected in presence of a soluble salt of a multivalent metal of a valency up to and including three, in aqueous solution of a concentration of at least 10%.

2. Process for preventing loss of lustre in bleaching, dyeing and other aqueous treatments of textile materials, films and other materials comprising cellulose acetate at temperatures in excess of about 85° C., characterized in that the treatment is effected in presence of a soluble salt of a divalent metal, in aqueous solution of a concentration of at least 10%.

3. Process for preventing loss of lustre in bleaching, dyeing and other aqueous treatments of textile materials, films and other materials comprising cellulose acetate at temperatures in excess of about 85° C., characterized in that the treatment is effected in presence of a soluble salt of a multivalent metal, of a valency up to and including three, in aqueous solution of 10 to 30% concentration.

4. Process for preventing loss of lustre in bleaching, dyeing and other aqueous treatments of textile materials, films and other materials comprising cellulose acetate at temperatures in excess of about 85° C., characterized in that the treatment is effected in presence of a soluble salt of a divalent metal, in aqueous solution of 10 to 30% concentration.

5. Process for preventing loss of lustre, in aqueous treatments at about boiling temperature, of textile material, films and other materials comprising cellulose acetate, comprising effecting the treatment in presence of a soluble salt of a multivalent metal of a valency up to and including three in aqueous solution of a concentration of at least 10%.

ARCHIBALD JOHN HALL.